April 14, 1970  W. SCHMIDT  3,505,933
APPARATUS FOR SEALING THE LONGITUDINAL SEAM OF OVERLAPPING
ENDS OF BLANKS FOR CONTAINER SIDES OF PAPER
Filed Dec. 27, 1966  2 Sheets-Sheet 1

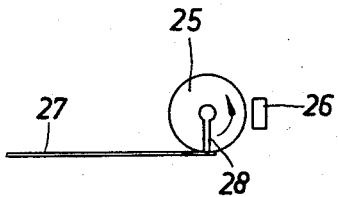
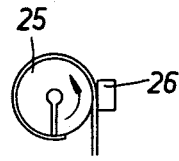
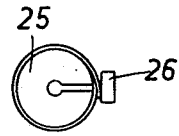
Fig.8 PRIOR ART    Fig.9 PRIOR ART    Fig.10 PRIOR ART
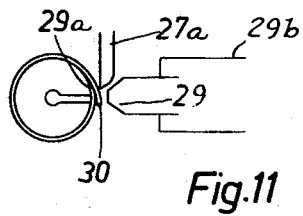
Fig.11
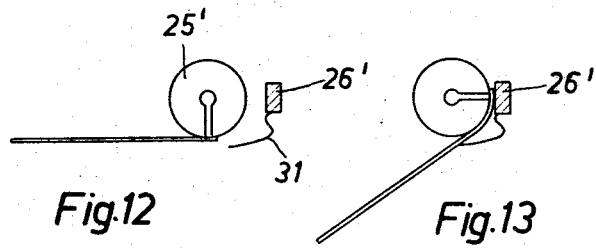
Fig.12    Fig.13    Fig.14
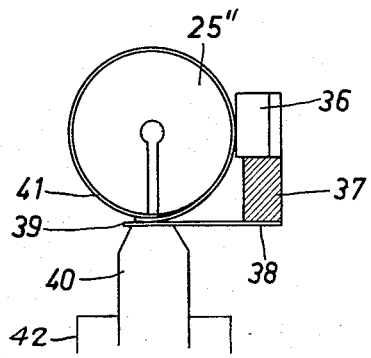
Fig.15

United States Patent Office 3,505,933
Patented Apr. 14, 1970

3,505,933
APPARATUS FOR SEALING THE LONGITUDINAL SEAM OF OVERLAPPING ENDS OF BLANKS FOR CONTAINER SIDES OF PAPER
Werner Schmidt, Hamburg, Germany, assignor to Maschinenfabrik Rissen G.m.b.H., Hamburg-Rissen, Germany
Filed Dec. 27, 1966, Ser. No. 604,721
Int. Cl. B31c 7/02
U.S. Cl. 93—79      2 Claims

ABSTRACT OF THE DISCLOSURE

Apparatus for forming container walls from blanks of paper, plastic, metal foil or the like. A turret carries a plurality of mandrels supporting the blanks as well as a plurality of clamping flaps for holding the ends of each blank in overlapping position to form a seam. One or more heating jaws are movably mounted on a stationary base for sealing each seam while one of the clamping flaps still acts on the seam.

---

The present invention relates to an apparatus for sealing the longitudinal seams of overlapping ends of blanks for side walls of containers of flexible sheet material such as paper, plastic sheet, metal foil or the like on a rotating mandrel wheel, turntable or turret by means of heated jaws which can be pressed against the seams.

In particular, the invention relates to the manufacture of the side walls of cylindrical, frustoconical or frustopyramidal hollow bodies, such as paper cups, the seams of which can be hot-sealed or welded. Even when using wet glues or cold glues the application of heat may be advantageous in order accelerate the setting.

Wall blanks can also be brought into the intended shape in shaping pots. However the invention refers only to the solution of problems which occur specifically in connection with the formation of the walls on mandrels rotating in mandrel wheels or turntables.

Since the vessels to be produced in most cases must later be handled by a machine (for instance in subsequent manufacturing stages, in packaging machines, or automatic beverage-dispensing machines) they must have great constant precision. If the walls are formed on mandrels, special measures must therefore be taken to maintain the overlapping shape which the tension of the paper tends to do away with, until the closing. In this connection the closing of the wall takes place after it has been brought into a precise dimension by the pressing of the overlap between the mandrel and a closing member. In this connection the pressure exerted and the elevated temperature possibly employed in this connection, as well as the time of the closing affect the quality and tightness of the seam.

The entire operation of shaping, application of a closing pressure and transfer of heat requires a relatively long time. There are known high speed machines in which a plurality of tools are arranged on turntables, and therefore it has been achieved that adhering or gluing times which extend beyond the individual machine tempo can be used. For this purpose all mandrels which are arranged on a rotating mandrel wheel or turret are equipped with heating members in the form of closure flaps. At a first station a wall blank is wound onto a mandrel or wrapped around it whereupon the heatable closure flap is applied and effects the closing. The closure flap remains under pressure while the mandrel is moved for instance into the next two stations. In each case the closure flap presses the overlap of a side wall together during a plurality of machine operations. In the last station the closure flap is opened so that the finished wall can be removed from the mandrel.

For example a machine performing 120 steps per minute in this way permits the closing of the wall during 2½ steps, and therefore within somewhat more than a second.

In the known machines for the hot-sealing of the seams there are always present such heatable closable flaps which travel with the mandrels. Up to now it was considered a particular advantage that the heatable closure flaps connected with the mandrels, despite a brief cycle, make a relatively long heating period possible. First of all it was believed that the long pressure and heat action assured a dependable quality of the seam. Secondly it is possible in this connection to select relatively low temperatures for the thermostatically controlled jaws. At high temperatures a higher heat loss was assumed to be present. It was known furthermore that higher temperatures not only are difficult to regulate, but also must be maintained more precisely with a narrower tolerance of ranges since temperatures exceeding a certain limit would result in browning of the material and damage to the seam.

Disadvantages of the known constructions are that a large number of heating members must be provided, namely, a number corresponding to the number of mandrels, that the temperature control of the heatable members, despite their lowest possible temperature, is often subject to failure since the controller lines must be passed into a turning system, and that the mandrels become undesirably hot.

The present invention avoids these disadvantages by means which fully contradict the previous experience, namely in the manner that clamping flaps and heating jaws which are independent of each other are provided, the former being provided at the overlap of the walls, traveling with the mandrels and being so controlled in conjunction therewith that they are held in clamping contact at least until the end of the closing process, while the latter are arranged at one or more stations on the frame and can be pressed briefly against the seams during the machine cycle.

The contact times with the heating jaws are naturally shorter than in the case of the known machines; the temperatures must be correspondingly higher. Furthermore in accordance with the invention separate clamping devices and heating jaws must be provided; the heatable members of the known machines have to a certain extent their function divided up. Despite these measures which appear at first glance to constitute a complication, the apparatus in accordance with the invention is simpler in construction and more dependable in operation.

The temperature of the heating jaws can be controlled more precisely since no transfer of current to a rotary system is necessary for the thermoelectric temperature measurement, and the danger of contact failure in the heating lines is minimized. In the known machines it is a very complicated matter to regulate all heating members individually with thermostats. If all heatable members are controlled jointly by a single thermostat very large differences can occur, particularly when the machine has once been stopped for a short time, and in this connection different heat losses have occurred at the individual heating members. As distinct therefrom, the temperature of the stationary heating jaws according to the invention can be held by customary means within a range of 5–10° C. One can thus bring the temperatures of the heating jaws very close to the browning temperature (in the case of paper about 300° C.). It has furthermore been found that the browning temperature with the short heat pulses given in accordance with the invention is higher, so that for this reason also higher temperatures can prevail at the heating jaws.

In accordance with the experience had with the known machines, it was assumed that high heating jaw temperatures are disadvantageous since as a result the other parts of the machine, and particularly the mandrels, are also heated more intensely. With the construction in accordance with the invention however, just the opposite has been found to be the case. This observation can be explained by the structural separation of the heating jaws from the mandrels and by the shorter contact times.

Finally, the heating jaws which in accordance with the invention do not revolve with the turret, may be pressed against the seams more intensely than revolving jaws, whereby the heat transfer and heat passage to the welding surface are improved.

One advantageous embodiment of the invention is characterized by the fact that the clamping devices or flaps which travel with the mandrels grasp only one edge of the overlap to be welded and that the heating jaws are pressed directly against the free part of the overlap. The clamping flaps therefore leave the greater part of the seam free for the heating jaws.

In another embodiment of the invention each of the clamping flaps comprises a thin sheet metal strip, metal foil strip or the like which substantially entirely covers the overlap, the heating jaw being capable of being pressed at the place of the overlap against the outside of the clamping strip.

The invention will be explained in further detail below with reference to the accompanying schematic drawings in which:

FIGS. 6–10 show the prior art,

FIG. 11 shows one embodiment,

FIGS. 12–14 a second embodiment, and

FIG. 15 shows a third embodiment of the invention.

Figure 1:
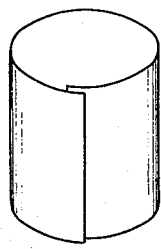
FIGURES 1–3 show examples of the walls to be made on the apparatus.
Figure 2:
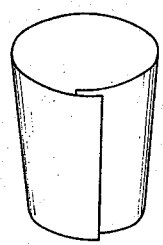
Figure 3:
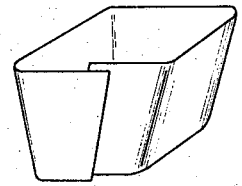
Figure 4:
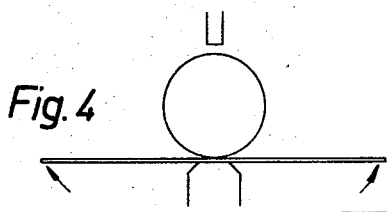
FIGS. 4 and 5 show the folding or wrapping of the blank around the mandrel.
Figure 5:
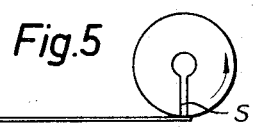

The side walls which for instance have known forms such as shown in FIGS. 1–3, are formed on mandrels around which they are wrapped as shown in FIG. 4 or wound as shown in FIG. 5, the side walls being held fast during the rolling by suction as indicated at S in FIG. 5 or else by small clamps or flaps or by springs.

Figure 6:
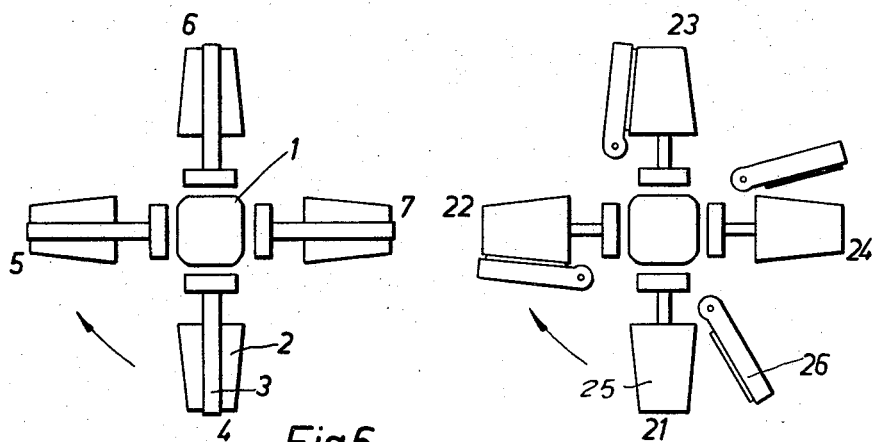
Figure 6A:
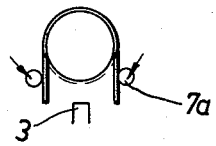

FIGS. 6 and 6a show a known apparatus in which a turret head 1 has four sides, each with a mandrel 2 and a clamp or flap 3, carried by the turret head 1. The latter is intermittently turnable about its center in the direction of the arrow so that each mandrel 2 and the respective flap 3 will be moved successively to four positions or stations designated 4, 5, 6 and 7. At the station 4 the side walls are formed in overlapped manner by bending, by means of bending tools or rolls 7a (FIG. 6a) whereupon the closing flap 3 is applied and effects the closing. The flap 3 now remains under pressure while the turret head moves into the station 5 and into the station 6; upon the further movement from the station 6 into the station 7 the flap is opened so that the side wall which has now been completely formed can be ejected in the station 7.

Figure 7:
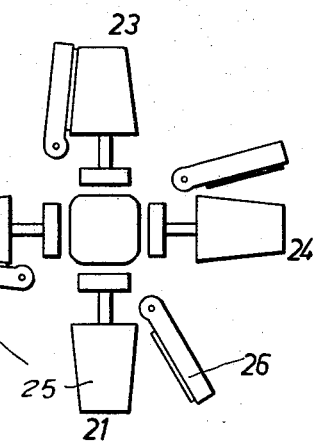

The production of a side wall by winding or rolling on a mandrel rather than by bending will be explained with reference to FIG. 7. In this figure there is shown a turret table or head, the dimensions of which are similar to those of turret head 1 in FIG. 6. The turret head of FIG. 7 again is intermittently turnable about its center in the direction of the arrow and each of its four sides is provided with a mandrel 25 and a closure flap 26 carried by the turret. During intermittent rotation of the turret head, each of the mandrels 25 and the respective flap 26 will successively move to four positions or stations designated 21, 22, 23 and 24. Some of the individual stations are shown as follows in FIGS. 8–10: In FIGURE 8 the position in station 21 is shown. The blank 27 is applied to the mandrel 25, drawn against it by the suction opening 28. During the movement from the station 21 into the station 22 the mandrel 25 is turned in the direction indicated by the arrow, a heatable closure flap 26 approaching the mandrel closely so that a certain wrapping resistance is produced and the side wall is placed firmly around the mandrel. FIG. 9 shows an intermediate position during the movement from station to station. Upon the completion of this movement the mandrel is then in station 22 as shown in FIG. 10. In the position of FIG. 9 the end of the blank still protrudes downward from the mandrel. In FIG. 10 the entire winding process has been completed and the heatable closure flap 26 now raises the temperature of the blank at the overlap and exerts continuous pressure which is also maintained in the station 23 to seal the seam, and upon the movement from the station 23 into the station 24 the flap 26 opens again so that thereupon in station 24 the completed wall is pushed down from the mandrel to finish the prior art procedure.

In accordance with the invention, the side wall is not contacted by a heatable closure member such as the flap 26 during several steps but only for a very short time during stoppage the sealing being effected by a separate heating jaw arranged on the outside of the machine frame. It will be seen that no space would be present where the heating jaw could act if a member similar to the prior art flap 26, which after all revolves with the machine, were in front of the mandrel. If a member similar to the flap 26 however, were removed from the closing position before the jaw coming from the outside enters into action, there would be the danger that the side wall would by itself spring open again, particularly if hot sealing is used or hot sealable material is to be welded together, and a high temperature has not yet been applied so that no adherence whatsoever of the overlap has as yet been brought about.

In accordance with the invention this difficulty is overcome in the manner that the closure means proper is divided into two parts, namely into a flap carried by a turret of the type shown at 1 in FIG. 6 and thus partaking in mandrel travel, such as the flap 27a in FIG. 11, and into a heating jaw 29 which is movably arranged not on a turret head but rather on the machine frame or stationary base indicated at 29b. The flap 27a which at the same time also produces the rolling pressure previously described with reference to FIG. 8 is so arranged that after the windings it still acts just on a marginal part of the overlap. It presses against the upper or outer end of paper in such a manner that the inner edge of the blank 29a located below the outer end is still acted on and the blank can no longer open, and the position of the parts of the seam with respect to each other can no longer change. Merely the protruding end 30 could now still open up somewhat after a corresponding gluing, but it would then be applied again in the station 22 by the heating jaw 29 which follows directly the flap 27a in the direction of the end 30.

If desirable, a second heating jaw may be arranged in the station 23 in such a manner that pressing by a jaw coming from the outside for fractions of a second takes place twice in succession.

For the temperature of the jaw 29 which is to be accurately maintained thermostatically it is no longer necessary in the arrangement according to the invention to make connections via wiper rings at different places, but rather each stationary jaw at the station 22 and, if desired, at the station 23 is individually heated and thermostatically controlled.

A particularly advantageous arrangement of this type is shown in FIGS. 12 to 14. Herein the closing member or flap 26′ generally corresponds to the arrangements in accordance with FIGS. 8–10. However, like the flap 27a of FIG. 11, the flap 26′ only has the function of contacting the paper under spring pressure, i.e. producing a corresponding resistance during the rolling; the flap is no longer heated. On this closing member or flap 26¹ there is arranged a strip 31 of sheet metal which revolves with the member 26′. FIGS 13 and 14 show how during the rolling process this strip 31 already presses the wall blank somewhat against the mandrel, but after the end of the rolling holds it fast so that it just includes the overlap and prevents the paper from separating again at the overlap. FIG. 14 now corresponds to a certain extent to FIG. 11, in which a thermostatically controlled heated jaw is present as second part of the total closure device. In FIG. 14, a heated jaw 32 supported on a stationary base 33 moves upward only during the period of standstill during which the mandrel 25′ is in the station 22 shown in FIG. 7, and welds the overlay at a precisely controlled temperature of for instance about 300° C., but in a short time of for instance about 200 milliseconds. On the mandrel 25′ opposite the heated closing jaw there is preferably provided an insert of an insulating material, while the entire remainder of the mandrel is suitably made of metal. The insulating piece causes an accumulation of heat. In other words, the heat which passes from the heated closure jaw 32 to the seal-seam cannot flow off into the metal part of the mandrel 25′.

Under certain circumstances it may also prove advantageous for the sheet metal strip to be made so long that it extends beyond the overlap, as shown in FIG. 15. In this case the flap 36, via an insulating piece 37, bears a sheet metal strip 38, which is extended to the point 39. It will be clear that here again flap 36 is carried by a turret of the type shown at 1 in FIG. 6. A closure jaw 40 supported on a stationary base 42 now does not act directly on the segment of paper 41, but only via the metal sheet 38. The sheet itself is made very thin, i.e. of a thickness of 1 mm. and of copper. The heat conduction transversely through the sheet is very rapid. However, so much heat must be applied by the closure jaw 40 that the entire sheet 38 is heated, in which connection however the insulating suspension via the block 37 has the effect that the heat to be applied is limited to the heat capacity of the copper sheet. When the heating operation at station 22 (compare FIG. 7) has been completed, the mandrel 25″ travels further with the flap 36 and sheet 38 which latter not only continues to hold the overlap together, but also somewhat delays the cooling of the glued seam between stations 22 and 23. This is due to the fact that the heat stored in the sheet flows off via the paper with which the sheet 38 is in contact, and keeps it warm. The glued seam passes thereby with higher discharge temperature into a second sealing station. A second heating jaw (not shown) of the type of jaw 40 brings the glued seam thus to a higher temperature and produces a more dependable seal. An advantage will be obtained even if the metal sheet 38 is not heated in the next station 23 (compare FIG. 7), but—in order to provide greater strength in subsequent operations—the seal seam is to be cooled in this station. In this case the second closure jaw and, if desired, in a further station a third closure jaw would be water-cooled. The cooling action, when it takes place through the metal sheet 38, will become greater than in the case of direct contact with the cooled jaw, since at first upon contact of the sheet 38 with the cooled jaw the heat flows out of the paper as well as out of the metal sheet into the jaw, and the metal sheet which has now become cold still exerts a further cooling action of the seal-seam upon the further advance.

What is claimed is:

1. In apparatus for forming container walls from blanks having a pair of longitudinal edges and made from flexible sheet material selected from the group consisting of paper, plastic, and metal foil, in combination, revolvable supporting means mounted on said apparatus for intermittent movement; a plurality of mandrels mounted on said revolvable supporting means, each of said mandrels being adapted to receive one of said blanks; a plurality of clamping devices carried by said revolvable supporting means so as to partake in said intermittent movement thereof, each of said clamping devices being arranged to cooperate with one of said mandrels for imparting a predetermined shape to the respective blank with said pair of longitudinal edges thereof overlapping each other to form a seam and for temporarily holding said overlapping edges in contact with each other; a stationary base; and heating jaw means movably mounted on said stationary base for subjecting said seam of the respective blank to the action of pressure and heat during stoppage of said intermittently revolvable supporting means and for thereby sealing said seam while the respective clamping device is still in clamping contact with said overlapping edges of the respective blanks; each of said clamping devices comprising a sheet metal strip arranged to extend laterally towards one side of said overlapping edges of the respective blank and to act on a marginal portion of said overlapping edges, said heating jaw means being adapted to act directly on the remaining portion of said overlapping edges.

2. In apparatus for forming container walls from blanks having a pair of longitudinal edges and made from flexible sheet material selected from the group consisting of paper, plastic, and metal foil, in combination, revolvable supporting means mounted on said apparatus for intermittent movement; a plurality of mandrels mounted on said revolvable supporting means, each of said mandrels being adapted to receive one of said blanks; a plurality of clamping devices carried by said revolvable supporting means so as to partake in said intermittent movement thereof, each of said clamping devices being arranged to cooperate with one of said mandrels for imparting a predetermined shape to the respective blank with said pair of longitudinal edges thereof overlapping each other to form a seam and for temporarily holding said overlapping edges in contact with each other; a stationary base; and heating jaw means movably mounted on said stationary base for subjecting said seam of the respective blank to the action of pressure and heat during stoppage of said intermittently revolvable supporting means and for thereby sealing said seam while the respective clamping device is still in clamping contact with said overlapping edges of the respective blanks; each of said clamping devices comprising a relatively thin strip of sheet metal adapted to contact at one of its sides and cover substantially the entire area of said seam of the respective blank, said heating jaw means being arranged to act on the other side of said relatively thin strip for transmission of pressure and heat through said strip to said seam.

References Cited

UNITED STATES PATENTS

| | | | |
|---|---|---|---|
| Re. 16,553 | 2/1927 | Edwards | 93—79 |
| 1,765,779 | 6/1930 | Tonelli | 93—79 |
| 2,154,825 | 4/1939 | Smith | 93—79 |
| 2,369,205 | 2/1945 | Balton | 93—79 |
| 2,674,929 | 4/1954 | Wittkuhns | 93—94 |
| 2,777,369 | 1/1957 | Monks | 93—79 |
| 2,819,659 | 1/1958 | Scott | 93—39.3 |
| 3,336,847 | 8/1967 | Durat | 93—94 |
| 3,343,465 | 9/1967 | Albert | 93—94 |
| 2,827,837 | 3/1958 | Meyer-Jagenberg | 93—36.05 X |
| 3,425,325 | 2/1969 | Lynch | 93—79 |
| 2,494,905 | 1/1950 | Shumann | 93—59 |
| 3,364,825 | 1/1968 | Baumgartner | 93—59 |

WAYNE A. MORSE, JR., Primary Examiner

U.S. Cl. X.R.

93—36.05, 36.1, 39.3, 59, 94